Dec. 5, 1933.   F. LANG   1,937,655
DIESEL ENGINE
Filed Jan. 22, 1932
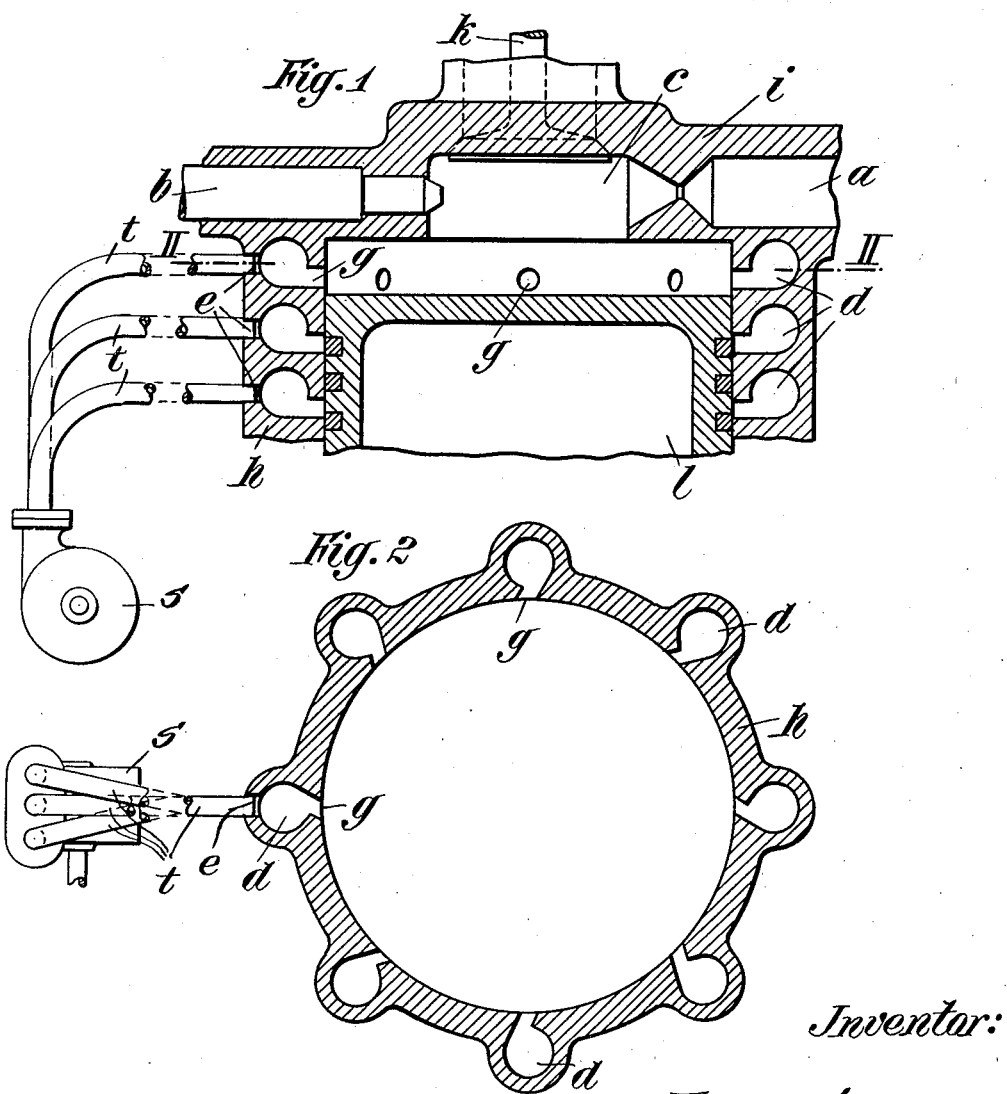

Patented Dec. 5, 1933

1,937,655

UNITED STATES PATENT OFFICE 1,937,655

DIESEL ENGINE

Franz Lang, Munich, Germany, assignor to Lanova Aktiengesellschaft, Vaduz, Lichtenstein Application January 22, 1932, Serial No. 588,211, and in Germany February 14, 1931

10 Claims. (Cl. 123—32)

My invention relates to Diesel engines, and more particularly to engines having an air storage chamber and a main combustion chamber connected to the air storage chamber. It is already known to provide auxiliary air chambers in such engines, and it is an object of my invention to provide a particularly suitable arrangement of an air storage chamber, together with one or more auxiliary airchambers.

To this end, I arrange the auxiliary airchamber or reservoirs, so that their openings into the cylinder are controlled by the piston and so positioned as to be beyond reach of the fuel issuing from a fuel-injection nozzle in the main combustion chamber.

In the accompanying drawing the cylinder head of an engine embodying my invention is illustrated by way of example.

In the drawing:

Fig. 1 is an axial section of the cylinder head, and

Fig. 2 is a section on the line II—II in Fig. 1.

Referring now to the drawing, $h$ is a cylinder, $i$ is the cylinder head, $k$ is an air inlet valve, and $l$ is the piston. $a$ is an air storage chamber in the cylinder head, $i$, $c$ is the main combustion chamber to which the chamber $a$ is connected, and $b$ is a fuel injection nozzle which opens into the chamber $c$.

In addition to the main air storage chamber $a$ I provide auxiliary pure air storage chambers $d$ which are here shown as cavities in the wall of the cylinder $h$, with ports $g$ opening into the interior of the cylinder. The openings are controlled by the piston $l$. In the example illustrated three parallel rows of auxiliary pure air storage chambers $d$ are provided and the chambers are distributed over the circumference of the cylinder.

All or part of the piston-controlled auxiliary airchambers may be equipped with passages $e$ for charging with air from a separate source, not shown. Such charging air may be admitted during compression and/or combustion.

In the drawing only one auxiliary air chamber per row has a charging passage $e$ but any number of reservoirs distributed over the circumference of the cylinder, may be supplied with charging air.

Air under suitable pressure, above atmospheric pressure, may be supplied to passages or ports $e$ of certain of the auxiliary pure air storage chambers $d$ in any suitable manner, as by means of a supercharger $s$, of known type, from which air under proper pressure is delivered, by means of suitable conduits $t$, to the ports $e$ of selected chambers $d$.

The air and gases discharged from the chamber $a$ cause intense whirling and churning of the contents of the main combustion chamber $c$ while the auxiliary chambers $d$, when their ports $g$ are opened by the piston $l$, impart whirling movement to the contents of the cylinder $h$ which is favorable for the combustion. Combustion is assisted in the main combustion chamber $c$ by the whirling and churning therein, and is further assisted by the air from the auxiliary chambers $d$. By admitting charging air, under any suitable pressure, through passages $e$ the performance and the efficiency of the engine are increased in conformity with the load, and complete combustion is obtained. This is particularly important for high-speed engines.

I claim:

1. In a Diesel engine, a cylinder and a piston operating therein, a main combustion chamber, an air storage chamber and a fuel injection nozzle connected to said combustion chamber, and auxiliary pure air storage chambers connected to said cylinder through piston-controlled openings arranged beyond reach of the fuel injected by said nozzle.

2. In a Diesel engine, a cylinder and a piston operating therein, a main combustion chamber, an air storage chamber and a fuel injection nozzle connected to said combustion chamber, and auxiliary pure air storage chambers arranged in parallel rows and connected to said cylinder through piston-controlled openings arranged beyond reach of the fuel injected by said nozzle.

3. In a Diesel engine, a cylinder and a piston operating therein, a main combustion chamber, an air storage chamber and a fuel injection nozzle connected to said combustion chamber, auxiliary pure air storage chambers connected to said cylinder through piston-controlled openings arranged beyond reach of the fuel injected by said nozzle, and means for supplying charging air to said auxiliary pure air storage chambers.

4. In combination in an injection engine, a cylinder and a piston operating therein, a main combustion chamber, an air storage chamber opening into the combustion chamber, an injection nozzle for injecting fuel into said combustion chamber, and auxiliary pure air storage chambers opening into the cylinder through ports controlled by the piston, said auxiliary chambers being otherwise out of communication with the main combustion chamber.

5. In combination in an injection engine, a cylinder and a piston operating therein, a main combustion chamber, an air storage chamber opening into the combustion chamber, an injection nozzle for injecting fuel into said combustion chamber, and auxiliary pure air storage chambers opening into the cylinder through ports controlled by the piston, said auxiliary chambers being otherwise out of communication with the main combustion chamber and with each other.

6. In combination in an injection engine, a cylinder and a piston operating therein, a main combustion chamber, an air storage chamber opening into the combustion chamber, an injection nozzle for injecting fuel into said combustion chamber, and an auxiliary pure air storage chamber opening into the cylinder through a port controlled by the piston, said auxiliary chamber being otherwise out of communication with the main combustion chamber.

7. In combination in an injection engine, a cylinder and a piston operating therein, a main combustion chamber, an air storage chamber opening into the combustion chamber, an injection nozzle for injecting fuel into said combustion chamber, and a plurality of auxiliary pure air storage chambers opening into the cylinder through ports controlled by the piston and spaced apart lengthwise of the cylinder, said auxiliary chambers being otherwise out of communication with the main combustion chamber and with each other.

8. In combination in an injection engine, a cylinder and a piston operating therein, a main combustion chamber, an air storage chamber opening into the combustion chamber, an injection nozzle for injecting fuel into said combustion chamber, and a plurality of auxiliary pure air storage chambers opening into the cylinder through ports controlled by the piston and spaced apart circumferentially of the cylinder and disposed substantially tangentially thereof, said auxiliary chambers being otherwise out of communication with the main combustion chamber and with each other.

9. In combination in an injection engine, a cylinder and a piston operating therein, a main combustion chamber overlying the cylinder area, said chamber being of less diameter than the cylinder and there being a shoulder extending from the cylinder wall to the chamber and disposed substantially normal to the cylinder axis, an air storage chamber opennig into the main combustion chamber, an injection nozzle for injecting fuel into the combustion chamber and disposed substantially normal to the cylnder axis, and auxiliary pure air storage chambers opening into the cylinder through piston controlled ports and otherwise out of communication with said combustion chamber.

10. In combination in an injection engine, a cylinder and a piston operating therein, a main combustion chamber overlying the cylinder area, said chamber being of less diameter than the cylinder and there being a shoulder extending from the cylinder wall to the chamber and disposed substantially normal to the cylinder axis, an air storage chamber opening into the combustion chamber, an injection nozzle for injecting fuel into the combustion chamber and disposed substantially normal to the cylinder axis, and to inject fuel toward the opening of the storage chamber, and auxiliary pure air storage chambers opening into the cylinder through piston controlled ports and otherwise out of communication with said combustion chamber.

FRANZ LANG.